(12) United States Patent
Emoto et al.

(10) Patent No.: US 11,838,157 B2
(45) Date of Patent: Dec. 5, 2023

(54) SIGNAL PROCESSING DEVICE, SIGNAL PROCESSING METHOD, AND SIGNAL PROCESSING PROGRAM

(71) Applicant: MITSUBISHI HEAVY INDUSTRIES, LTD., Tokyo (JP)

(72) Inventors: Hideaki Emoto, Yokohama (JP); Mitsuyuki Shirae, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/782,310

(22) PCT Filed: Nov. 18, 2020

(86) PCT No.: PCT/JP2020/042904
§ 371 (c)(1),
(2) Date: Jun. 3, 2022

(87) PCT Pub. No.: WO2021/117433
PCT Pub. Date: Jun. 17, 2021

(65) Prior Publication Data
US 2022/0385506 A1    Dec. 1, 2022

(30) Foreign Application Priority Data
Dec. 9, 2019  (JP) ................................ 2019-222173

(51) Int. Cl.
*H04L 27/14*  (2006.01)
(52) U.S. Cl.
CPC ................................... *H04L 27/14* (2013.01)
(58) Field of Classification Search
CPC . H04L 27/14; H04L 27/2271; H04L 27/2273; H04L 27/2276; H04L 2027/0024;
(Continued)

(56) References Cited

U.S. PATENT DOCUMENTS 6,297,691 B1 * 10/2001 Anderson ........... H04L 27/2331
329/304
2013/0188752 A1    7/2013 Sin
(Continued)

FOREIGN PATENT DOCUMENTS

JP    2003-536310 A    12/2003
JP    2011-050102 A    3/2011
(Continued)

OTHER PUBLICATIONS

International Search Report dated Feb. 16, 2021, issued in counterpart Application No. PCT/JP2020/042904. (8 pages).
(Continued)

*Primary Examiner* — Siu M Lee
(74) *Attorney, Agent, or Firm* — WHDA, LLP

(57) ABSTRACT

A signal processing device including an acquisition unit configured to acquire signal waveform data corresponding to a frequency signal, a generation unit configured to generate a sine wave and a cosine wave of demodulation waveform data having a demodulation frequency between the first frequency and the second frequency, a first phase calculation unit configured to calculate a first phase based on a multiplication result of the sine wave and the signal waveform data at a first time and a multiplication result of the cosine wave and the signal waveform data at the first time, a second phase calculation unit configured to calculate a second phase based on a multiplication result of the sine wave and the signal waveform data at a second time advanced from the first time by a specified time interval less than one cycle of the demodulation frequency.

7 Claims, 4 Drawing Sheets

(58) Field of Classification Search
CPC ....... H04L 2027/003; H04L 2027/0032; H04L 2027/0048; G05B 19/4185; G05B 2219/25428; G05B 2219/31135
See application file for complete search history.

(56) References Cited

U.S. PATENT DOCUMENTS

| | | |
|---|---|---|
| 2014/0269764 A1 | 9/2014 | Borgeson et al. |
| 2016/0189745 A1* | 6/2016 | Minamino ....... G11B 20/10222 369/47.28 |
| 2018/0191539 A1* | 7/2018 | Haran ...................... H04L 1/00 |

FOREIGN PATENT DOCUMENTS

| | | |
|---|---|---|
| JP | 2012-199779 A | 10/2012 |
| JP | 2013-149256 A | 8/2013 |
| JP | 2014-178754 A | 9/2014 |
| JP | 2016-522593 A | 7/2016 |
| WO | 2001/95478 A2 | 12/2001 |

OTHER PUBLICATIONS

Notification Concerning Transmittal of International Preliminary Report on Patentability (Forms PCT/IB/326) issued in counterpart International Application No. PCT/JP2020/042904 dated Jun. 23, 2022 with Forms PCT/IB/373, PCT/IB/338 and PCT/ISA/237. (10 pages).

* cited by examiner

SIGNAL PROCESSING DEVICE, SIGNAL PROCESSING METHOD, AND SIGNAL PROCESSING PROGRAM

TECHNICAL FIELD

The present disclosure relates to a method for achieving a device that supports hybrid communication (smart communication) such as HART communication.

BACKGROUND

Conventionally, a hybrid communication (smart communication) method for simultaneously transmitting multiple signals by superimposing a digital signal on a 4 mA to 20 mA analog signal (DC signal) has been known, such as a HART (Highway Addressable Remote Transducer) communication method (for example, Patent Documents 1 to 4). Specifically, in HART communication, for example, a DC analog signal corresponding to a measurement value or a control value transmitted from a transmitting device to a receiving device is modulated by a modem at frequency corresponding to a binary value of 0 or 1 to superimpose a digital signal, and the superimposed signal is transmitted to a signal line. On the receiving side, the digital signal is reproduced by a modem from the frequency component of the superimposed signal received from the signal line. On the other hand, the analog signal is extracted by cutting the frequency component from the superimposed signal by a filter.

Such hybrid communication is performed between hybrid communication-capable devices, for example, in process instrumentation of a plant. The plant is equipped with numerous field devices including transmitters (measuring instruments) such as differential pressure transducers and temperature transducers, and final control elements such as regulating valves. By connecting each field device to a control device through an individual signal line, analog signals for communicating measurement values such as temperature, flow rate, and pressure measured by the measuring instruments and command values such as valve opening to the final control elements are transmitted through the signal lines. When hybrid communication is applied to the communication between the field devices and the control device, by superimposing digital signals corresponding to device information, such as maintenance information, on the analog signals (measurement signals, control signals) transmitted through the signal lines, it is possible to simultaneously communicate measurement values and device information.

CITATION LIST

Patent Literature

Patent Document 1: JP2013-149256A
Patent Document 2: JP2011-50102A
Patent Document 3: JP2014-178754A
Patent Document 4: JP2012-199779A

SUMMARY

Problems to be Solved

In order to make a device such as the field devices and the control device compatible with hybrid communication such as HART communication, it is necessary to implement a function in the device to determine a signal value (0 or 1) assigned to a frequency on the basis of the frequency of the AC signal (frequency signal) superimposed on the DC signal. For this reason, hardware such as the above-described modem is mounted on the device, which requires the cost. For example, the plant is equipped with numerous field devices, but the cost increases as the number of devices that support hybrid communication increases.

In view of the above, an object of at least one embodiment of the present invention is to provide a signal processing device for converting a frequency signal into a digital value which can be manufactured more inexpensively.

Solution to the Problems

A signal processing device according to at least one embodiment of the present invention is a signal processing device for processing a frequency signal having a first frequency or a second frequency higher than the first frequency, comprising: an acquisition unit configured to acquire signal waveform data corresponding to the frequency signal; a generation unit configured to generate a sine wave and a cosine wave of demodulation waveform data having a demodulation frequency between the first frequency and the second frequency; a first phase calculation unit configured to calculate a first phase based on a multiplication result of the sine wave and the signal waveform data at a first time and a multiplication result of the cosine wave and the signal waveform data at the first time; a second phase calculation unit configured to calculate a second phase based on a multiplication result of the sine wave and the signal waveform data at a second time advanced from the first time by a specified time interval less than one cycle of the demodulation frequency and a multiplication result of the cosine wave and the signal waveform data at the second time; and a conversion unit configured to output a signal value of the acquired frequency signal, based on comparison between the first phase and the second phase.

A signal processing method according to at least one embodiment of the present invention is a signal processing method for processing a frequency signal having a first frequency or a second frequency higher than the first frequency, comprising: a step of acquiring signal waveform data corresponding to the frequency signal; a step of generating a sine wave and a cosine wave of demodulation waveform data having a demodulation frequency between the first frequency and the second frequency; a step of calculating a first phase based on a multiplication result of the sine wave and the signal waveform data at a first time and a multiplication result of the cosine wave and the signal waveform data at the first time; a step of calculating a second phase based on a multiplication result of the sine wave and the signal waveform data at a second time advanced from the first time by a specified time interval less than one cycle of the demodulation frequency and a multiplication result of the cosine wave and the signal waveform data at the second time; and a step of outputting a signal value of the acquired frequency signal, based on comparison between the first phase and the second phase.

A signal processing program according to at least one embodiment of the present invention is a signal processing program for processing a frequency signal having a first frequency or a second frequency higher than the first frequency, configured to cause a computer to implement: an acquisition unit configured to acquire signal waveform data corresponding to the frequency signal; a generation unit configured to generate a sine wave and a cosine wave of demodulation waveform data having a demodulation frequency between the first frequency and the second frequency; a first phase calculation unit configured to calculate a first phase based on a multiplication result of the sine wave and the signal waveform data at a first time and a multiplication result of the cosine wave and the signal waveform data at the first time; a second phase calculation unit configured to calculate a second phase based on a multiplication result of the sine wave and the signal waveform data at a second time advanced from the first time by a specified time interval less than one cycle of the demodulation frequency and a multiplication result of the cosine wave and the signal waveform data at the second time; and a conversion unit configured to output a signal value of the acquired frequency signal, based on comparison between the first phase and the second phase.

Advantageous Effects

At least one embodiment of the present invention provides a signal processing device for converting a frequency signal into a digital value which can be manufactured more inexpensively.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
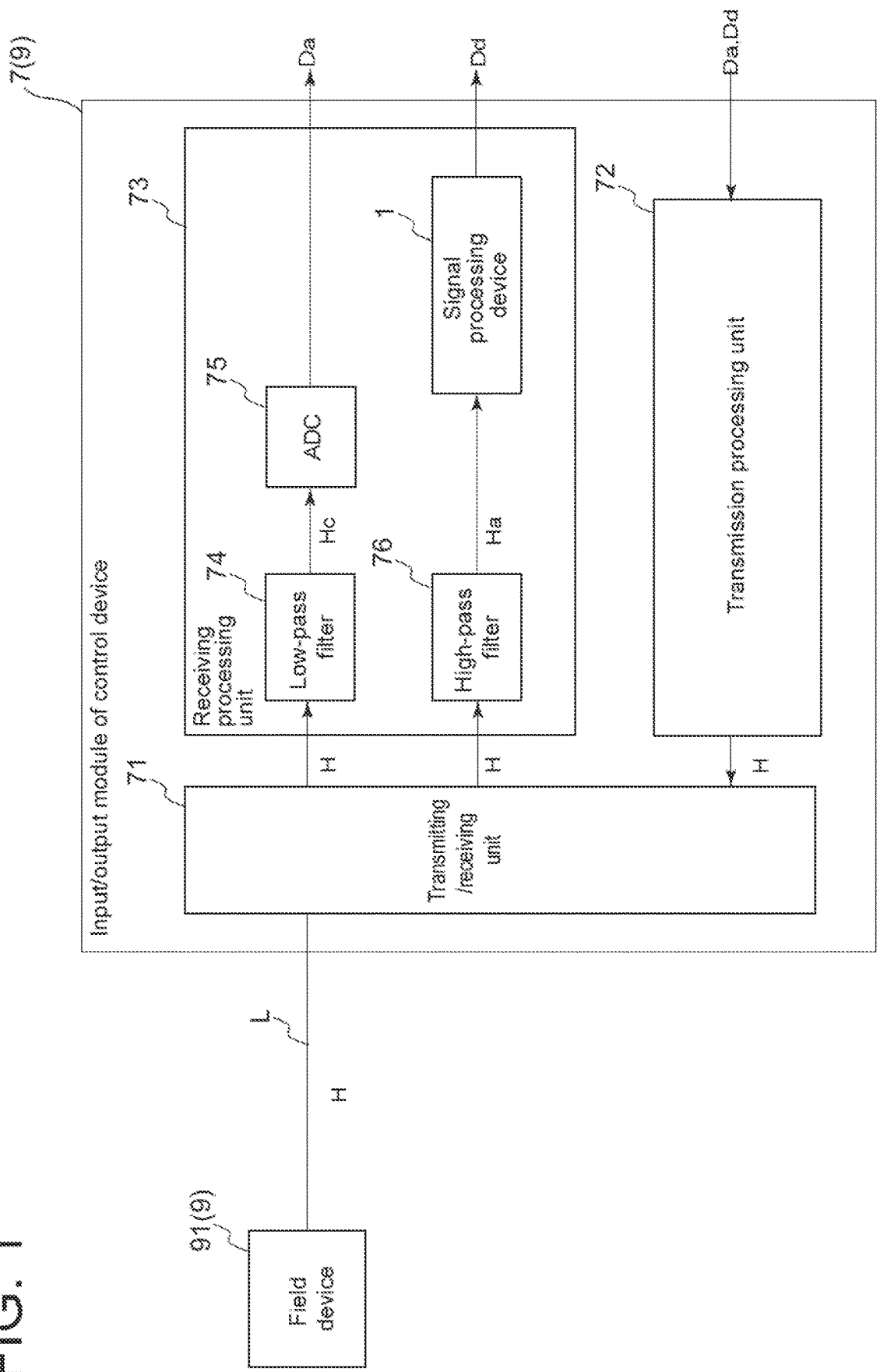
FIG. 1 is a schematic configuration diagram of an input/output module of a control device which processes hybrid communication according to an embodiment of the present invention.
Figure 2:
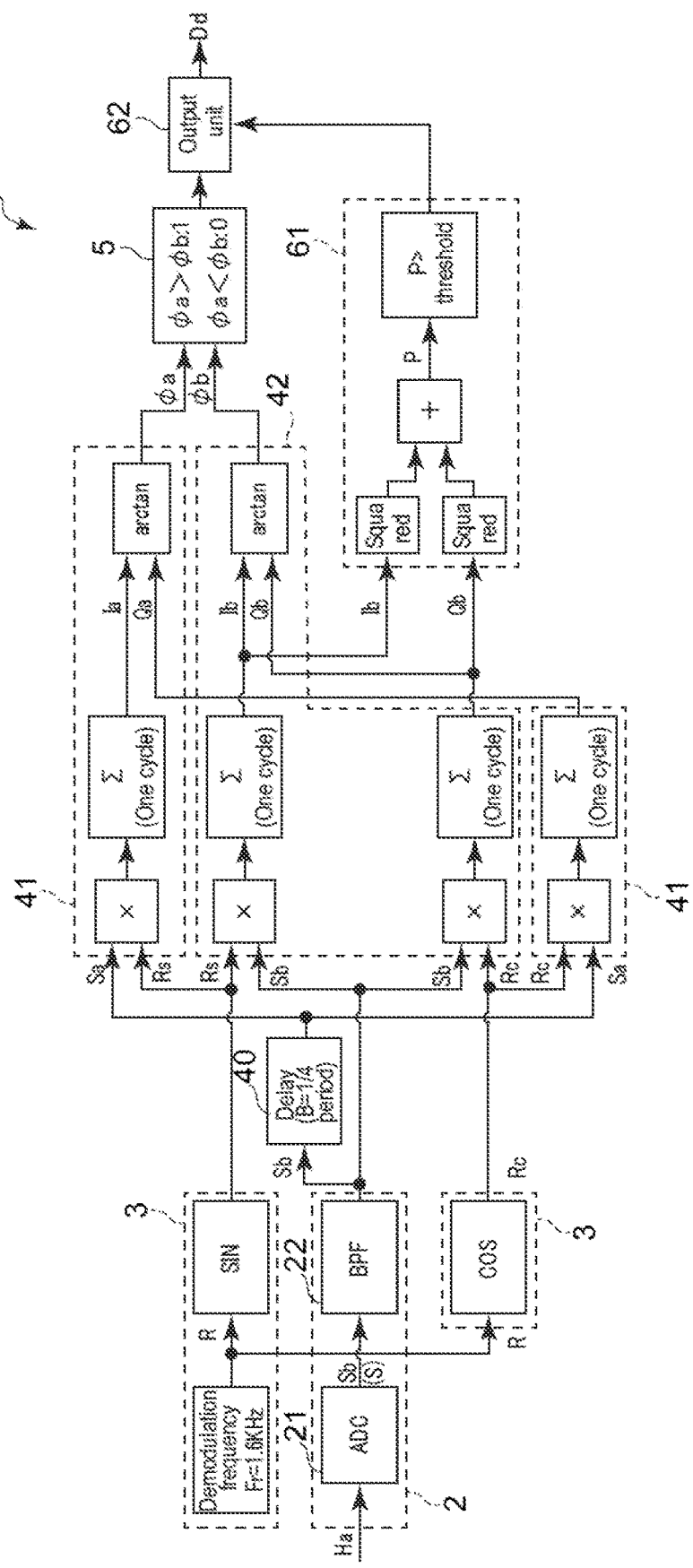
FIG. 2 is a schematic configuration diagram of a signal processing device according to an embodiment of the present invention.
Figure 3:
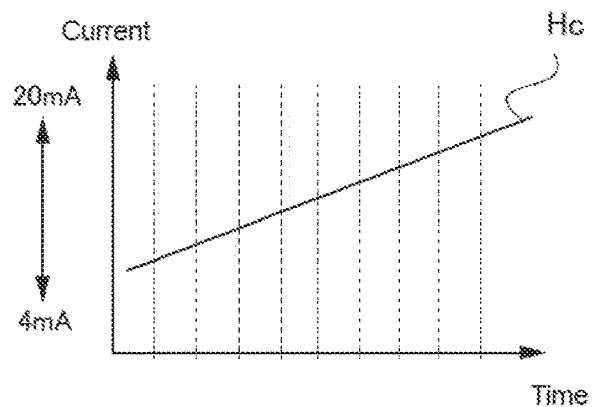
FIG. 3 is a diagram showing an example of a DC signal according to an embodiment of the present invention.
Figure 4:
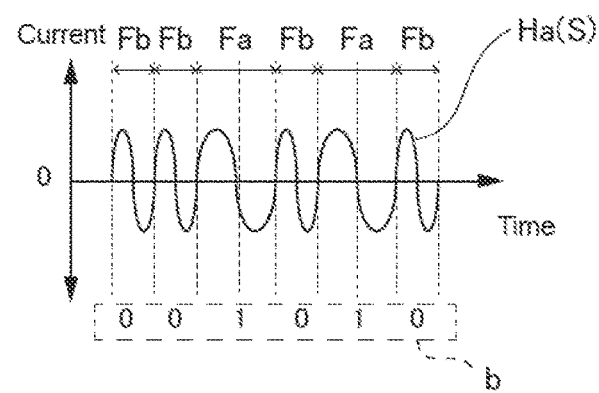
FIG. 4 is a diagram showing an example of a frequency signal according to an embodiment of the present invention.
Figure 5:
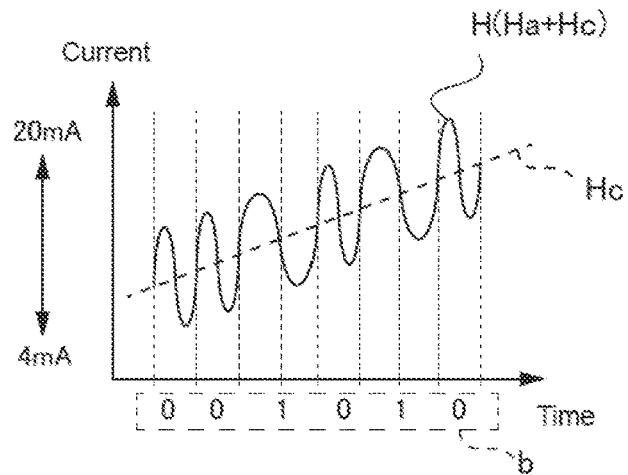
FIG. 5 is a diagram showing an example of a HART signal according to an embodiment of the present invention.

FIG. 1 is a schematic configuration diagram of an input/output module 7 of a control device which processes hybrid communication according to an embodiment of the present invention. FIG. 2 is a schematic configuration diagram of a signal processing device 1 according to an embodiment of the present invention. FIG. 3 is a diagram showing an example of a DC signal Hc according to an embodiment of the present invention. FIG. 4 is a diagram showing an example of a frequency signal Ha according to an embodiment of the present invention. FIG. 5 is a diagram showing an example of a HART signal according to an embodiment of the present invention.

As shown in FIG. 1, a device 9 capable of hybrid communication (input/output module 7 of control device in FIG. 1) is provided with a signal processing device 1 described below. The signal processing device 1 is a device for converting a frequency signal Ha contained in a hybrid signal H received by the device 9 into a digital value. The hybrid signal H (see FIG. 5) is a signal generated by frequency modulation of an analog signal (DC signal Hc) transmitted using direct current (DC) at two frequencies defined for values "0" and "1" according to a digital signal to be communicated, and is obtained by superimposing a frequency signal Ha (see FIG. 4) corresponding to the digital signal on the DC signal Hc (see FIG. 3).

When the device 9 which performs hybrid communication receives the hybrid signal H transmitted from another device 9 as the communication partner through a signal line L connecting the devices 9, a frequency component (frequency signal Ha) is extracted from the hybrid signal H, and the frequency signal Ha is converted into a digital value by the signal processing device 1. Further, the DC signal Hc is obtained by removing the frequency component (frequency signal Ha) from the hybrid signal H.

More specifically, for example, the device 9 which performs hybrid communication is a field device 91 installed in the plant. The plant is equipped with numerous field devices 91 including various measuring instruments (sensors) for measuring temperature, flow rate, and pressure, and final control elements such as regulating valves (valve). Further, each field device 91 is connected by an individual signal line L to a control device which controls the plant such as a distributed control system (DCS). The analog signal is used for communication of information (hereinafter, analog main information Da) on a measurement value transmitted from the measuring instrument to the control device or a command value transmitted from the control device to the final control element (e.g., valve opening command value transmitted to the valve). More specifically, the analog main information Da is associated (mapped) with current values of 4 mA to 20 mA of the analog signal, for example, with 4 mA for 0% and 20 mA for 100%, to communicate the analog main information Da on the analog signal.

On the other hand, the digital signal is used for communication of information (hereinafter, digital additional information Dd) on a process value or device information about the device that is the source of the digital signal, such as the identification number of the measuring instrument that measured the measurement value. Specifically, different frequencies (first frequency Fa and second frequency Fb, which will be described later) are in advance assigned to digital values (0 or 1) for bits constituting a bit string b that indicates the digital additional information Dd, and a frequency signal Ha corresponding to the bit value of each bit constituting the bit string b that indicates the digital additional information Dd is generated (see FIG. 4) to communication the bit of the digital additional information Dd on the frequency signal Ha.

In the embodiment shown in FIG. 1, the signal processing device 1 is configured to perform HART communication, which is a kind of hybrid communication. In HART communication, with 2.2 kHz and 1.2 kHz used to represent digital values 0 and 1, respectively, a 4 mA to 20 mA direct current (DC) analog signal is modulated to form a hybrid signal H (HART signal), and the hybrid signal H is transmitted to the signal line L according to the sequence of bits of the digital additional information Dd.

Further, in the embodiment shown in FIG. 1, the signal processing device 1 is incorporated in a module (input/output module) constituting the control device of the plant. The input/output module 7 is connected by a transmitting/receiving unit 71 to the signal line L, and the hybrid signal H output to the signal line L from the field device 91 which is the communication partner in HART communication is input by the transmitting/receiving unit 71 to the input/output module 7. The transmitting/receiving unit 71 may be, for example, a transformer.

The transmitting/receiving unit 71 is connected to a transmission processing unit 72 and a receiving processing unit 73 in the input/output module 7. The transmission processing unit 72 is a functional unit configured to acquire the analog main information Da and the digital additional information Dd input (requested) from a higher-level function and generate the hybrid signal H. In the present embodiment, the higher-level function is a CPU module (not shown) of the control device (DCS). The CPU module (not shown) is responsible for the overall calculation function of the control device, and has a calculation unit for calculating an output based on one or more inputs from multiple input/output modules 7 and outputting the calculation result to the target input/output module 7, etc.

The transmission processing unit 72 may include, for example, a functional unit configured to electrically generate (current or voltage) a DC signal Hc corresponding to the analog main information Da input from the higher-level function, a functional unit configured to electrically generate a frequency signal Ha for superimposing the digital additional information Dd input from the higher-level function, and a multiplexer connected to the two functional units and configured to electrically superimpose the DC signal Hc and the frequency signal Ha to output a combined wave (hybrid signal H). The multiplexer is connected to the transmitting/receiving unit 71. Alternatively, the DC signal Hc may be modulated by a modem according to the output of a DA converter which converts the frequency signal Ha into the DC signal Hc to synthesize the hybrid signal H of the 4 mA to 20 mA DC signal Hc with the modulated waveform.

The receiving processing unit 73 is a functional unit configured to acquire the analog main information Da and the digital additional information Dd communicated by the input hybrid signal H and transmit them to the higher-level function. The receiving processing unit 73 includes, as a configuration for reproducing the analog main information Da from the hybrid signal H, a low-pass filter 74 for extracting the frequency signal Ha that is a DC component of the hybrid signal H, and a first AD conversion unit 75 (AD: Analog to Digital convert) connected to the low-pass filter 74.

Further, the receiving processing unit 73 includes, as a configuration for reproducing the digital additional information Dd from the hybrid signal H, a high-pass filter 76 for extracting the frequency signal Ha that is an AC component of the hybrid signal H, and the signal processing device 1 connected to the high-pass filter 76. The high-pass filter 76 is connected to the signal processing device 1 and sequentially outputs the input frequency signal Ha to the signal processing device 1.

Hereinafter, the signal processing device 1 will be described in conjunction with the case where HART communication is performed between the control device, which is the device 9 equipped with the signal processing device 1, and the field device 91, which is the device 9 as the communication partner, with reference to FIG. 2.

The signal processing device 1 is a device configured to determine a signal value of the frequency signal Ha, e.g., the frequency signal Ha communicated through hybrid communication such as HART communication, of a specified cycle with frequencies of 1.2 kHz (hereinafter, first frequency Fa) to which the digital value "1" is assigned and 2.2 kHz (hereinafter, second frequency Fb) higher than the first frequency to which the digital value "0" is assigned, and convert the signal into a digital value (binary 1 or 0). As shown in FIG. 2, the signal processing device 1 includes an acquisition unit 2, a generation unit 3, a first phase calculation unit 41, a second phase calculation unit 42, and a conversion unit 5.

Each functional unit of the signal processing device 1 will now be described.

In the following description, the signal processing device 1 is included in the control device, but the signal processing device 1 may be included in at least one of the control device or the field device 91. When the signal processing device 1 is included in the field device 91, the control device can be read as the field device 91. Further, the signal processing device 1 may be implemented by using MCU or an integrated circuit whose logic function can be configured by a designer, namely PLD (Programmable Logic Device) such as FPGA (Field-Programmable Gate Array). For example, a CPU (processor) (not shown) and a memory such as ROM or RAM may be formed on FPGA, and the CPU may operate (e.g., computation of data) in accordance with program instructions (signal processing program) loaded to the memory to implement the functional units of the signal processing device 1.

The acquisition unit 2 is a functional unit configured to acquire signal waveform data S corresponding to the frequency signal Ha separated from the hybrid signal H received by the device 9. The signal waveform data S is data composed of at least one value after AD conversion of the amplitude of the frequency signal Ha at any time, and the waveform can be obtained by arranging AD-converted values at multiple times in chronological order. In the embodiment shown in FIG. 2, the acquisition unit 2 includes a second AD conversion unit 21 and a band-pass filter unit 22 (BPF). The second AD conversion unit 21 is connected to the high-pass filter 76 (see FIG. 1), and is configured to sequentially AD-convert the frequency signal Ha input from the high-pass filter 76 and input the AD-converted signal to the band-pass filter unit 22.

The generation unit 3 is a functional unit configured to generate a sine wave Rs and a cosine wave Rc of demodulation waveform data R having a demodulation frequency Fr (Fa<Fr<Fb) between the first frequency Fa and the second frequency Fb. In the embodiment shown in FIG. 2, the demodulation frequency Fr is, for example, 1.6 kHz between the first frequency Fa (2.2 kHz) and the second frequency Fb (1.2 kHz). Further, the cosine wave Rc is generated by shifting the phase of the sine wave (sin) of the demodulation waveform data R by 90°.

The first phase calculation unit 41 is a functional unit configured to calculate a first phase φa based on a multiplication result of the sine wave Rs of the demodulation waveform data R and the signal waveform data S (hereinafter, first signal waveform data Sa) at a first time Ta, which is a freely-selected time, and a multiplication result of the cosine wave Rc of the demodulation waveform data R and the first signal waveform data Sa at the first time Ta.

Similarly, the second phase calculation unit 42 is a functional unit configured to calculate a second phase φb based on a multiplication result of the sine wave Rs of the demodulation waveform data R and the signal waveform data S (hereinafter, second signal waveform data Sb) at a second time Tb (Tb>Ta), which is advanced from the first time Ta by a specified time interval B (B=Tb−Ta, 0<B<1/Fr) less than one cycle of the demodulation frequency Fr, and a multiplication result of the cosine wave Rc of the demodulation waveform data R and the second signal waveform data Sb at the second time Tb.

The specified time interval B may be, for example, 1/N (N is an integer) of the period of the demodulation waveform data R. In the embodiment shown in FIG. 2, the specified time interval B is ¼ period (B=¼×1/Fr) of the demodulation waveform data R. More specifically, the first time Ta is the time when the phase of the signal waveform data S having the first frequency Fa or the second frequency Fb is 0°, and the second time Tb is the time when the phase of the signal waveform data S is 90°. The "multiplication" means obtaining a calculation result equivalent to multiplication, and in practice, the calculation result equivalent to multiplication may be obtained by addition.

Here, it is known, as synchronous detection for example, that by processing two multiplication results obtained by multiplying an input signal (signal waveform data S in FIG. 2) by sine wave Rs or cosine wave Rc of a reference signal (demodulation waveform data R in FIG. 2) with a low-pass filter, a low frequency signal proportional to in-phase component I and quadrature-phase component Q of the input signal can be extracted. Further, by simply calculating the square root of the sum of the squares of the in-phase component I and the quadrature-phase component Q, the amplitude of the input signal can be obtained (amplitude=$\sqrt{\{Q^2+I^2\}}$). Further, by calculating $\tan^{-1}(Q/I)$, the phase difference between the reference signal and the input signal can be obtained.

Thus, the first phase calculation unit 41 calculates as the first phase φa a phase difference of the first signal waveform data Sa from the demodulation waveform data R at the first time Ta, for example, based on the sine wave Rs and the cosine wave Rc of the demodulation waveform data R and the first signal waveform data Sa delayed by the specified time interval B with respect to the second signal waveform data Sb input to the second phase calculation unit 42. The second phase calculation unit 42 calculates as the second phase φb a phase difference of the second signal waveform data Sb from the demodulation waveform data R at the second time Tb, for example, based on the sine wave Rs and the cosine wave Rc of the demodulation waveform data R and the second signal waveform data Sb advanced by the specified time interval B with respect to the first signal waveform data Sa input to the first phase calculation unit 41.

The conversion unit 5 is a functional unit configured to determine a signal value (0 or 1) of the frequency signal Ha based on the first phase φa and the second phase φb calculated by the first phase calculation unit 41 and the second phase calculation unit 42, respectively. More specifically, the first phase φa and the second phase φb are the phase differences of the signal waveform data S with respect to the demodulation waveform data R at two times separated by the specified time interval B. If the signal waveform data S has the demodulation frequency Fr, the second phase φb is 0, but, in practice, the frequency of the signal waveform data S is either the first frequency Fa or the second frequency Fb, which is higher or lower than the demodulation frequency Fr. Thus, since the frequencies of the signal waveform data S and the demodulation waveform data R are different, the phase difference at two times separated by the specified time interval B depends on the magnitude relationship between the frequency of the signal waveform data S and the demodulation frequency Fr.

Specifically, when the frequency of the signal waveform data S at the time of acquisition (hereinafter, current frequency Fc) is the second frequency Fb, which is higher than the demodulation frequency Fr (Fc>Fr), the phase of the signal waveform data S advances faster than when it is the first frequency Fa. Thus, the phase difference (second phase φb) at the second time Tb is larger than the phase difference (first phase φa) at the first time Ta, so that the relationship of φa<φb holds when Fc>Fr. Conversely, when the current frequency Fc of the signal waveform data S is the first frequency Fa, which is lower than the demodulation frequency Fr (Fc<Fr), the phase of the signal waveform data S advances slower than when it is the second frequency Fb. Thus, the phase difference (second phase φb) at the second time Tb is smaller than the phase difference (first phase φa) at the first time Ta, so that the relationship of φa>φb holds when Fc<Fr.

In other words, φa<φb means that the current frequency Fc of the signal waveform data S has the second frequency Fb (2.2 kHz in this embodiment), and φa>φb means that the current frequency Fc of the signal waveform data S has the first frequency Fa (1.2 kHz in this embodiment). Therefore, by comparing the first phase φa at the first time Ta with the second phase φb at the second time Tb, it is possible to determine whether the current frequency Fc of the signal waveform data S is the first frequency Fa or the second frequency Fb.

In the embodiment shown in FIG. 2, the value of the signal waveform data S (Sb) acquired by the acquisition unit 2 is delayed by a delay unit 40 by the specified time interval B and then input to the first phase calculation unit 41 (Sa). Further, the signal waveform data S (Sb) acquired by the acquisition unit 2 is input to the second phase calculation unit 42 as it is without delay. Further, the sine wave Rs and the cosine wave Rc of the demodulation waveform data R synchronized with the signal waveform data S (Sb) input to the second phase calculation unit 42 are input to the first phase calculation unit 41 and the second phase calculation unit 42.

The first phase calculation unit 41 multiplies one cycle of the input first signal waveform data Sa by the sine wave Rs and the cosine wave Rc of the demodulation waveform data R input from the generation unit 3 to calculate the in-phase component I (first in-phase component Ia) and the quadrature-phase component Q (first quadrature-phase component Qa), respectively. The first phase φa is calculated by calculating (arctan) $\tan^{-1}$ (Qa/Ia) of these calculation results. The second phase calculation unit 42 multiplies one cycle of the input second signal waveform data Sb by the sine wave Rs and the cosine wave Rc of the demodulation waveform data R input from the generation unit 3 to calculate the in-phase component I (second in-phase component Ib) and the quadrature-phase component Q (second quadrature-phase component Qb), respectively. The second phase φb is calculated by calculating (arctan) $\tan^{-1}$ (Qb/Ib) of these calculation results.

Then, the conversion unit 5 compares the first phase φa input from the first phase calculation unit 41 with the second phase φb input from the second phase calculation unit 42, and outputs "1" when φa>φb and "0" when φa<φb. In other words, the conversion unit 5 outputs the digital value (1) to which the first frequency Fa is assigned when the second phase φb is larger than the first phase φa (φa>φb), and outputs the digital value (0) to which the second frequency Fb is assigned when the second phase φb is smaller than the first phase φa (φa<φb). Thus, the frequency signal Ha can be appropriately converted into a digital value based on comparison between the first phase φa and the second phase φb.

According to the above configuration, the signal processing device 1 converts the frequency signal Ha extracted from the hybrid signal H into a digital value 0 or 1. Specifically, the sine wave Rs and the cosine wave Rc (wave obtained by shifting the sine wave Rs by 90°) of the demodulation waveform data R having a frequency (demodulation frequency Fr) between two frequencies (first frequency Fa and second frequency Fb) assigned to digital values 0 and 1 are prepared and multiplied by AD-converted data (signal waveform data S) of the frequency signal Ha. Then, the phases (phase differences) at two times (first time Ta and second time Tb) separated by the specified time interval B are calculated, and it is determined whether the frequency signal Ha indicate "0" or "1" based on the calculated phases.

Thus, the frequency signal Ha can be converted into a digital value based on the first phase φa and the second phase φb. Further, with such a software method, it is possible to reproduce a digital signal of hybrid communication such as HART communication without a relatively expensive modem.

Additionally, in some embodiments, as shown in FIG. 2, the signal processing device 1 may further include a determination unit 61 configured to determine the validity of the signal value of the frequency signal Ha output from the conversion unit 5, and an output unit 62 configured to output the signal value of the frequency signal Ha determined to be valid as a result of determination by the determination unit 61 externally (downstream). In the embodiment shown in FIG. 2, the conversion unit 5 is connected to the output unit 62, and the digital additional information Dd is output from the output unit 62 to the higher-level function.

This assumes the case where an AC signal flows through the signal line L connecting the devices 9 due to noise or the like even when hybrid communication is not performed. In such a case, it is necessary to prevent a malfunction in which the signal processing device 1 erroneously outputs the digital additional information Dd to the higher-level function. For this purpose, the output unit 62 outputs the digital additional information Dd that is determined to be valid by the determination unit 61 to ensure that the output from the output unit 62 is the processing result for the frequency signal Ha received by the hybrid communication.

In this regard, for example, if the conversion unit 5 is configured to output "0" except in the case of "1", "0" may be output even when the communication partner device 9 is not performing hybrid communication using the signal line L. In such a case, even when hybrid communication is not actually performed, it may be determined that the frequency signal Ha corresponding to "0" is communicated through the signal line L, and as a result, a malfunction may occur. To solve this problem, the validity of the output from the conversion unit 5 is determined, and if it is determined to be valid, the digital additional information Dd is output.

In the embodiment shown in FIG. 2, the determination unit 61 detects whether the frequency signal Ha is flowing through the signal line L for connecting to the communication partner device 9 (for example, field device 91 in FIG. 1). In other words, the determination unit 61 detects whether the frequency signal Ha (hybrid signal H) is flowing through the signal line L (carrier detection) to determine whether the communication partner device 9 is performing hybrid communication.

Specifically, the second in-phase component Ib and the second quadrature-phase component Qb calculated in the process of calculating the second phase φb by the second phase calculation unit 42 are input to the determination unit 61 to calculate the sum of squares thereof ($\sqrt{\{Qb^2+Ib^2\}}$). Further, when the calculation result of the sum of squares (hereinafter, power P) is larger than a specified threshold V (P>L), the determination unit 61 determines that the signal value input from the conversion unit 5 to the output unit 62 is a result of processing the frequency signal Ha of the hybrid signal H by hybrid communication and thus is valid. Conversely, when the power P is equal to or smaller than the specified threshold V (P<L), the determination unit 61 determines that the signal value input from the conversion unit 5 to the output unit 62 is invalid. The threshold V is set to a value that can distinguish between noise and the frequency signal Ha. The determination unit 61 then inputs the notification (signal) according to validity or invalidity to the output unit 62, and the output unit 62 judges the validity based on this input.

According to the above configuration, when hybrid communication (HART communication in FIG. 2) is not actually performed between the devices 9, and the hybrid signal H does not flow through the signal line L connecting the devices 9, it is possible to prevent a malfunction in which the signal processing device 1 erroneously outputs a processing result due to the influence of noise or the like.

Figure 6:
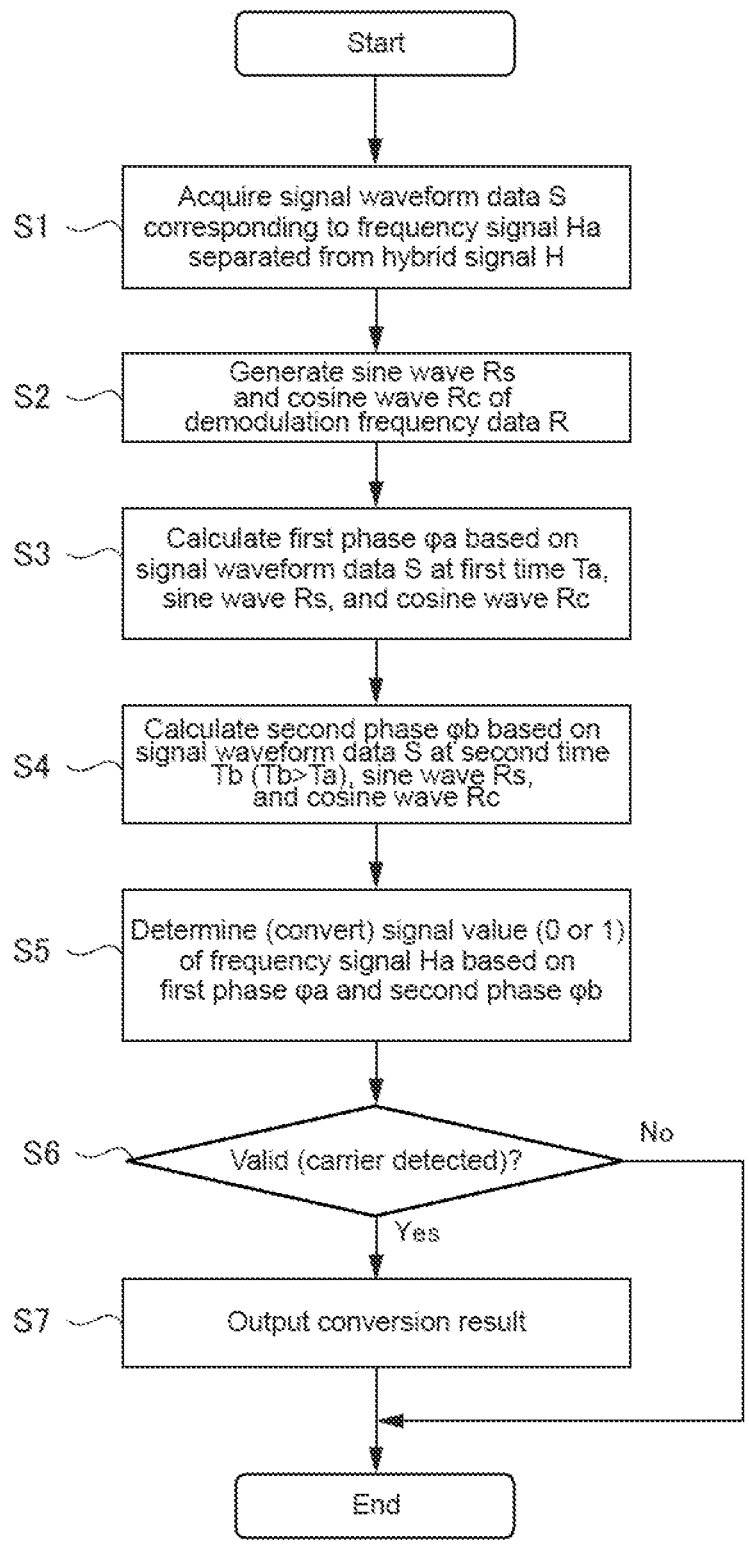
FIG. 6 is a diagram showing a signal processing method according to an embodiment of the present invention.

Hereinafter, the signal processing method corresponding to the process performed by the signal processing device 1 having the above configuration (function) will be described with reference to FIG. 6. FIG. 6 is a diagram showing the signal processing method according to an embodiment of the present invention.

The signal processing method is a method for determining a signal value of the frequency signal Ha having the first frequency Fa or the second frequency Fb to which the digital value "0" or "1" is assigned, and converting the signal into a digital value. As shown in FIG. 6, the signal processing method includes an acquisition step, a generation step, a first phase calculation step, a second phase calculation step, and a conversion step.

Each step will be described according to the flow of FIG. 6.

In step S1 of FIG. 6, the acquisition step is performed. The acquisition step is a step of acquiring signal waveform data S corresponding to the frequency signal Ha separated from the hybrid signal H received by the device 9. The acquisition step is the same as the processing content performed by the acquisition unit 2 as already described and thus not described again in detail.

In step S2, the generation step is performed. The generation step is a step of generating a sine wave Rs and a cosine wave Rc of demodulation waveform data R having a demodulation frequency Fr (Fa<Fr<Fb) between the first frequency Fa and the second frequency Fb. The generation step is the same as the processing content performed by the generation unit 3 as already described and thus not described again in detail.

In step S3, the first phase calculation step is performed. The first phase calculation step is a step of calculating a first phase φa based on a multiplication result of the sine wave Rs of the demodulation waveform data R and the first signal waveform data Sa at the first time Ta, and a multiplication result of the cosine wave Rc of the demodulation waveform data R and the first signal waveform data Sa at the first time Ta. The first phase calculation step is the same as the processing content performed by the first phase calculation unit 41 as already described and thus not described again in detail.

In step S4, the second phase calculation step is performed. The second phase calculation step is a step of calculating a second phase φb based on a multiplication result of the sine wave Rs of the demodulation waveform data R and the second signal waveform data Sb at the second time Tb, which is advanced from the first time Ta by the specified time interval B, and a multiplication result of the cosine wave Rc of the demodulation waveform data R and the second signal waveform data Sb at the second time Tb. The second phase calculation step is the same as the processing content performed by the second phase calculation unit 42 as already described and thus not described again in detail.

In step S5, the conversion step is performed. The conversion step is a step of determining a signal value (0 or 1) of the frequency signal Ha based on the first phase φa and the second phase φb calculated in the first phase calculation step and the second phase calculation step, respectively. The conversion step is the same as the processing content performed by the conversion unit 5 as already described and thus not described again in detail, but it may include converting the signal into the digital value (1) to which the first frequency Fa is assigned when the second phase φb is larger than the first phase φa (φa>φb), and converting the signal into the digital value (0) to which the second frequency Fb is assigned when the second phase φb is smaller than the first phase φa (φa<φb). Thus, the frequency signal Ha can be converted into a digital value based on comparison between the first phase φa and the second phase φb.

The order of the acquisition step and the generation step, and the order of the first phase calculation step and the second phase calculation step may be reversed, or may be performed in parallel, for example, as in the example of FIG. 2. The flow of FIG. 6 is repeated every cycle of the frequency signal Ha (signal waveform data S).

Additionally, in some embodiments, the signal processing method may further include a determination step of determining the validity of the signal value of the frequency signal Ha obtained in the conversion step, and an output step of outputting (adopting) the signal value of the frequency signal Ha determined to be valid as a result of determination by the determination unit 61. The determination step and the output step are the same as the processing contents performed by the determination unit 61 and the output unit 62 as already described and thus not described again in detail. In the embodiment shown in FIG. 6, the determination result of the determination step is confirmed in step S6, and if the determination result is valid, the output step is performed in step S7. Conversely, if the determination result of the determination step is invalid in step S6, the output step is not performed. Since the determination step determines the validity of the signal waveform data S acquired in the acquisition step (S1 in FIG. 6), it may be performed before or after any of the steps S1 to S5, or may be performed in parallel with these steps.

The present invention is not limited to the embodiments described above, but includes modifications to the embodiments described above, and embodiments composed of combinations of those embodiments.

APPENDIX (1) A signal processing device (1) according to at least one embodiment of the present invention is a signal processing device (1) for processing a frequency signal (Ha) having a first frequency (Fa) or a second frequency (Fb) higher than the first frequency (Fa), comprising: an acquisition unit (2) configured to acquire signal waveform data (S) corresponding to the frequency signal (Ha); a generation unit (3) configured to generate a sine wave and a cosine wave of demodulation waveform data (R) having a demodulation frequency (Fr) between the first frequency (Fa) and the second frequency (Fb); a first phase calculation unit (41) configured to calculate a first phase based on a multiplication result of the sine wave and the signal waveform data (S) at a first time (Ta) and a multiplication result of the cosine wave and the signal waveform data (S) at the first time (Ta); a second phase calculation unit (42) configured to calculate a second phase based on a multiplication result of the sine wave and the signal waveform data (S) at a second time (Tb) advanced from the first time (Ta) by a specified time interval (B) less than one cycle of the demodulation frequency (Fr) and a multiplication result of the cosine wave and the signal waveform data (S) at the second time (Tb); and a conversion unit (5) configured to output a signal value of the acquired frequency signal (Ha), based on comparison between the first phase and the second phase.

According to the above configuration (1), the signal processing device (1) converts the frequency signal (Ha) extracted from the hybrid signal (H) into a digital value 0 or 1. Specifically, the sine wave and the cosine wave (wave obtained by shifting the sine wave Rs by) 90° of the demodulation waveform data (R) having a frequency (demodulation frequency Fr) between two frequencies (first frequency Fa and second frequency Fb) assigned to digital values 0 and 1 are prepared and multiplied by the AD-converted data (signal waveform data S) of the frequency signal (Ha). Then, the phases (phase differences) at two times (first time Ta and second time Tb) separated by a period (e.g., ¼ period) of the demodulation waveform data (R) are calculated, and it is determined whether the frequency signal (Ha) indicate "0" or "1" based on the calculated phases.

For example, the two phases (first phase φa and second phase φb) before and after the specified time interval (B) obtained by the multiplication are phase differences of the signal frequencies with respect to the demodulation frequency (Fr). If the signal waveform data (S) has the demodulation frequency (Fr), the second phase is 0, but, in practice, the frequency of the demodulation waveform data (R) is higher or lower than the demodulation frequency Fr. Thus, since the frequencies of the signal waveform data (S) and the demodulation waveform data (R) are different, the phase difference at two times separated by the specified time interval (B) depends on the magnitude relationship between the frequency of the signal waveform data (S) and the demodulation frequency (Fr).

Thus, the frequency signal (Ha) can be converted into a digital value based on the first phase and the second phase.

Further, with such a software method, it is possible to reproduce a digital signal of hybrid communication such as HART communication without a relatively expensive modem.

(2) In some embodiments, in the above configuration (1), the first phase and the second phase are phase differences of the signal waveform data (S) from the demodulation waveform data (R). The conversion unit (5) outputs a digital value to which the second frequency (Fb) is assigned when the second phase is larger than the first phase, and outputs a digital value to which the first frequency (Fa) is assigned when the second phase is smaller than the first phase.

According to the above configuration (2), the frequency signal (Ha) can be appropriately converted into a digital value based on comparison between the first phase and the second phase.

(3) In some embodiments, in any one of the above configurations (1) to (2), the first time (Ta) is a time when the phase of the sine wave of the demodulation waveform data (R) is 0°, and the specified time interval (B) corresponds to ¼ of period of the demodulation waveform data (R).

According to the above configuration (3), it is possible to appropriately determine whether the frequency signal (Ha) indicates "0" or "1", and it is possible to simplify the configuration of the phase calculation units.

(4) In some embodiments, in any one of the above configurations (1) to (3), the signal processing device may further comprise a determination unit (61) configured to determine the validity of the signal value of the frequency signal (Ha) output from the conversion unit (5); and an output unit (62) configured to externally output the signal value of the frequency signal (Ha) determined to be valid as a result of determination by the determination unit (61).

According to the above configuration (4), when hybrid communication is not actually performed between the devices (9), and the hybrid signal (H) does not flow through the signal line (L) connecting the devices (9), it is possible to prevent a malfunction in which the signal processing device (1) erroneously outputs a processing result due to the influence of noise or the like.

(5) In some embodiments, in any one of the above configurations (1) to (4), the frequency signal (Ha) is a signal extracted from a hybrid signal (H) in which the frequency signal (Ha) is superimposed on a DC signal (Hc).

According to the above configuration (5), it is possible to appropriately reproduce the communication information communicated through hybrid communication such as HART communication.

(6) A signal processing method according to at least one embodiment of the present invention is a signal processing method for processing a frequency signal (Ha) having a first frequency (Fa) or a second frequency (Fb) higher than the first frequency (Fa), comprising: a step of acquiring signal waveform data (S) corresponding to the frequency signal (Ha); a step of generating a sine wave and a cosine wave of demodulation waveform data (R) having a demodulation frequency (Fr) between the first frequency (Fa) and the second frequency (Fb); a step of calculating a first phase based on a multiplication result of the sine wave and the signal waveform data (S) at a first time (Ta) and a multiplication result of the cosine wave and the signal waveform data (S) at the first time (Ta); a step of calculating a second phase based on a multiplication result of the sine wave and the signal waveform data (S) at a second time (Tb) advanced from the first time (Ta) by a specified time interval (B) less than one cycle of the demodulation frequency (Fr) and a multiplication result of the cosine wave and the signal waveform data (S) at the second time (Tb); and a step of outputting a signal value of the acquired frequency signal (Ha), based on comparison between the first phase and the second phase.

According to the above configuration (6), the same effect is achieved as in the above (1).

(7) A signal processing program according to at least one embodiment of the present invention is a signal processing program for processing a frequency signal (Ha) having a first frequency (Fa) or a second frequency (Fb) higher than the first frequency (Fa), configured to cause a computer to implement: an acquisition unit (2) configured to acquire signal waveform data (S) corresponding to the frequency signal (Ha); a generation unit (3) configured to generate a sine wave and a cosine wave of demodulation waveform data (R) having a demodulation frequency (Fr) between the first frequency (Fa) and the second frequency (Fb); a first phase calculation unit (41) configured to calculate a first phase based on a multiplication result of the sine wave and the signal waveform data (S) at a first time (Ta) and a multiplication result of the cosine wave and the signal waveform data (S) at the first time (Ta); a second phase calculation unit (42) configured to calculate a second phase based on a multiplication result of the sine wave and the signal waveform data (S) at a second time (Tb) advanced from the first time (Ta) by a specified time interval (B) less than one cycle of the demodulation frequency (Fr) and a multiplication result of the cosine wave and the signal waveform data (S) at the second time (Tb); and a conversion unit (5) configured to output a signal value of the acquired frequency signal (Ha), based on comparison between the first phase and the second phase.

According to the above configuration (7), the same effect is achieved as in the above (1).

REFERENCE SIGNS LIST

1 Signal processing device
2 Acquisition unit
21 Second AD conversion unit
22 Band-pass filter unit
3 Generation unit
40 Delay unit
41 First phase calculation unit
42 Second phase calculation unit
5 Conversion unit
61 Determination unit
62 Output unit
7 Input/output module
71 Transmitting/receiving unit
72 Transmission processing unit
73 Receiving processing unit
74 Low-pass filter
75 First AD conversion unit
76 High-pass filter
9 Device
91 Field device
L Signal line
H hybrid signal
Hc DC signal
Ha Frequency signal (AC signal)
Fa First frequency
Fb Second frequency
R Demodulation waveform data
Fr Demodulation frequency
Rc Cosine wave of demodulation waveform data
Rs Sine wave of demodulation waveform data S Signal waveform data
Sa First signal waveform data
Sb Second signal waveform data
Ta First time
Tb Second time
B Specified time interval
Ia First in-phase component
Ib Second in-phase component
Qa First quadrature-phase component
Qb Second quadrature-phase component
Da Analog main information
Dd Digital additional information
b Bit string
P Power
V Threshold

The invention claimed is:

1. A signal processing device for processing a frequency signal having a first frequency or a second frequency higher than the first frequency, comprising:
an acquisition circuit configured to acquire signal waveform data corresponding to the frequency signal;
a generation circuit configured to generate a sine wave and a cosine wave of demodulation waveform data having a demodulation frequency between the first frequency and the second frequency;
a first phase calculation circuit configured to calculate a first phase based on a multiplication result of the sine wave and the signal waveform data at a first time and a multiplication result of the cosine wave and the signal waveform data at the first time;
a second phase calculation circuit configured to calculate a second phase based on a multiplication result of the sine wave and the signal waveform data at a second time advanced from the first time by a specified time interval less than one cycle of the demodulation frequency and a multiplication result of the cosine wave and the signal waveform data at the second time; and
a conversion circuit configured to output a signal value of the acquired frequency signal, based on comparison between the first phase and the second phase.

2. The signal processing device according to claim 1,
wherein the first phase and the second phase are phase differences of the signal waveform data from the demodulation waveform data, and
wherein the conversion circuit outputs a digital value to which the second frequency is assigned when the second phase is larger than the first phase, and outputs a digital value to which the first frequency is assigned when the second phase is smaller than the first phase.

3. The signal processing device according to claim 1,
wherein the first time is a time when phase of the sine wave of the demodulation waveform data is 0°, and
wherein the specified time interval corresponds to ¼ of period of the demodulation waveform data.

4. The signal processing device according to claim 1, further comprising:
a determination circuit configured to determine validity of the signal value of the frequency signal output from the conversion circuit; and
an output circuit configured to externally output the signal value of the frequency signal determined to be valid as a result of determination by the determination circuit.

5. The signal processing device according to claim 1,
wherein the frequency signal is a signal extracted from a hybrid signal in which the frequency signal is superimposed on a DC signal.

6. A signal processing method for processing a frequency signal having a first frequency or a second frequency higher than the first frequency, comprising:
a step of acquiring signal waveform data corresponding to the frequency signal;
a step of generating a sine wave and a cosine wave of demodulation waveform data having a demodulation frequency between the first frequency and the second frequency;
a step of calculating a first phase based on a multiplication result of the sine wave and the signal waveform data at a first time and a multiplication result of the cosine wave and the signal waveform data at the first time;
a step of calculating a second phase based on a multiplication result of the sine wave and the signal waveform data at a second time advanced from the first time by a specified time interval less than one cycle of the demodulation frequency and a multiplication result of the cosine wave and the signal waveform data at the second time; and
a step of outputting a signal value of the acquired frequency signal, based on comparison between the first phase and the second phase.

7. A non-transitory computer-readable storage medium for storing a signal processing program for processing a frequency signal having a first frequency or a second frequency higher than the first frequency, the signal processing program being configured to cause a computer to implement:
acquiring signal waveform data corresponding to the frequency signal;
generating a sine wave and a cosine wave of demodulation waveform data having a demodulation frequency between the first frequency and the second frequency;
calculating a first phase based on a multiplication result of the sine wave and the signal waveform data at a first time and a multiplication result of the cosine wave and the signal waveform data at the first time;
calculating a second phase based on a multiplication result of the sine wave and the signal waveform data at a second time advanced from the first time by a specified time interval less than one cycle of the demodulation frequency and a multiplication result of the cosine wave and the signal waveform data at the second time; and
outputting a signal value of the acquired frequency signal, based on comparison between the first phase and the second phase.

* * * * *